(12) United States Patent
Aydin et al.

(10) Patent No.: US 9,268,582 B2
(45) Date of Patent: Feb. 23, 2016

(54) METHOD AND DEVICE ENABLING THE EXECUTION OF HETEROGENEOUS TRANSACTION COMPONENTS

(75) Inventors: Alev Aydin, Elancourt (FR); Francois Jaouen, Les Clayes Sous Bois (FR)

(73) Assignee: BULL SAS, Les Clayes Sous Bois (FR)

(*) Notice: Subject to any disclaimer, the term of this patent is extended or adjusted under 35 U.S.C. 154(b) by 274 days.

(21) Appl. No.: 13/263,698

(22) PCT Filed: Mar. 31, 2010

(86) PCT No.: PCT/FR2010/050615
§ 371 (c)(1),
(2), (4) Date: Oct. 7, 2011

(87) PCT Pub. No.: WO2010/116072
PCT Pub. Date: Oct. 14, 2010

(65) Prior Publication Data
US 2012/0042314 A1 Feb. 16, 2012

(30) Foreign Application Priority Data
Apr. 9, 2009 (FR) ..................... 09 01764

(51) Int. Cl.
*G06F 9/455* (2006.01)
*G06F 9/46* (2006.01)
(Continued)

(52) U.S. Cl.
CPC .............. *G06F 9/455* (2013.01); *G06F 9/4552* (2013.01); *G06F 9/45516* (2013.01); *G06F 9/45533* (2013.01); *G06F 9/45558* (2013.01); *G06F 9/466* (2013.01); *G06F 17/30424* (2013.01); *G06F 17/30427* (2013.01); *G06F 17/30439* (2013.01); *G06F 17/30442* (2013.01); *G06F 17/30448* (2013.01)

(58) Field of Classification Search
None
See application file for complete search history.

(56) References Cited

U.S. PATENT DOCUMENTS 5,428,771 A * 6/1995 Daniels et al. ................ 718/101
5,768,587 A * 6/1998 Freund et al. ................ 718/101
(Continued)

FOREIGN PATENT DOCUMENTS

GB 23131456 11/1997
GB 2339 622 2/2000

OTHER PUBLICATIONS

Barga, et al. "Reflection on a Legacy Transaction Processing Monitor", Proceedings Reflection 1996; pp. 1-16, XP 002561100.
(Continued)

*Primary Examiner* — Charles Swift
(74) *Attorney, Agent, or Firm* — Pillsbury Winthrop Shaw Pittman LLP

(57) ABSTRACT

The invention especially relates to the execution of at least one transaction in a transaction processing system comprising a transaction-oriented monitor (205), said at least one transaction being executable in an open-type execution environment, by the sequential execution of a plurality of transaction-oriented components (235, 240). According to the invention, and owner-type execution space is created (275) for enabling the execution of at least one transaction-oriented component from said plurality of transaction-oriented components, said at least one transaction-oriented component being developed for an owner-type execution environment separate from the open-type execution environment, during the reception (255) of a corresponding execution control from the transaction-oriented monitor.

18 Claims, 7 Drawing Sheets

(51) Int. Cl.
*G06F 7/00* (2006.01)
*G06F 17/30* (2006.01)

(56) References Cited

U.S. PATENT DOCUMENTS

| | | | | |
|---|---|---|---|---|
| 5,852,732 A | * | 12/1998 | Freund et al. | 718/101 |
| 6,151,637 A | | 11/2000 | Phillips et al. | |
| 6,230,117 B1 | * | 5/2001 | Lymer et al. | 703/22 |
| 6,237,018 B1 | * | 5/2001 | Chessell | 718/101 |
| 6,983,468 B1 | * | 1/2006 | Green et al. | 719/331 |
| 8,074,220 B2 | * | 12/2011 | Thole | 718/101 |
| 2002/0038336 A1 | * | 3/2002 | Abileah et al. | 709/203 |
| 2005/0125503 A1 | * | 6/2005 | Iyengar et al. | 709/213 |
| 2006/0282400 A1 | | 12/2006 | Kalavacharla et al. | |
| 2008/0288766 A1 | * | 11/2008 | Inoue | G06F 9/455 713/2 |
| 2009/0234953 A1 | * | 9/2009 | Braslavsky | 709/227 |
| 2009/0282410 A1 | * | 11/2009 | Moir et al. | 718/101 |

OTHER PUBLICATIONS

PCT International Search Report for PCT Application No. PCT/FR2010/050615, mailed Sep. 9, 2010.

* cited by examiner

METHOD AND DEVICE ENABLING THE EXECUTION OF HETEROGENEOUS TRANSACTION COMPONENTS

CROSS-REFERENCE TO RELATED APPLICATIONS

This application is a U.S. National Phase under 35 U.S.C. §371 of International Application PCT/FR2010/050615, filed Mar. 31, 2010, which designated the U.S., and, which claims priority under 35 U.S.C. §119 to France Patent Application Number FR 0901764, filed on Apr. 9, 2009. The disclosures of the above-described applications are hereby expressly incorporated by reference in their entireties.

The present invention concerns transaction systems and more particularly a method and a device for executing transaction processes, in an open computing environment, making use of transaction components developed for a proprietary-type execution environment not compatible with that open environment. The present invention is thus directed to a method and a device enabling the execution of heterogeneous transaction components.

The concept of transaction was developed for database management systems in the 1970's. Computer applications implementing transaction processes are commonly used in numerous applications such as financial management, the management of persons and the management of services. These applications are based on complex information systems in which several applications share data stored on different machines connected to a communication network. The object of transaction management is in particular to maintain the consistency of the data accessed and the updates to those data by distinct applications.

In general terms, a transaction is a sequence of operations executed on data of the information system. To ensure the consistency of the data processed, the transactions must comply with properties of atomicity, consistency, isolation and durability, termed ACID. Atomicity is the characteristic whereby if a transaction terminates properly it has the desired effects on the data whereas if it meets a problem in course of execution, it has no effect on the data. In other words, each transaction must lead to a success or to a failure but must not remain in an intermediate state. Consistency is directed to preserving the consistency of the data. The effect of isolation is that a transaction is not visible to the other transactions. Durability is directed to the permanent validity of the effects of the transactions which took place normally on the data.

Originally, transaction systems were generally developed on mainframe type systems, that is to say centralized computers having high computation capacities and memory. The operating systems and development environment for those systems were generally of proprietary-type, that is to say specific to the machines on which they run. More particularly, each computer manufacturer developing a mainframe type machine also developed an execution environment specific to that machine. Thus a transaction application developed for a mainframe type system is not easily portable to another system.

Moreover, although the manufacturers of such systems generally ensure forwards compatibility of the applications on their new systems, a user cannot transport a set of applications developed for a particular execution environment of particular type to another environment.

Furthermore, a large proportion of the applications implementing transactions is developed in a language called COBOL (acronym for COmmon Business Oriented Language), which is particularly suited to the development of those applications. However, although numerous applications are still based on that language, the latter is tending to be replaced by other languages such as the C language or the Java language (Java is a trademark). Consequently, there are increasingly fewer programmers competent in that language to maintain those applications and to develop new ones.

Due to these constraints generated by the proprietary aspect of certain systems of mainframe type and by the COBOL language implemented in numerous transaction applications, there is a need to adapt those applications to open-type systems, that is to say systems whose technical specifications are made public, enabling third parties to develop, port, and even modernize those applications.

It has thus been envisioned to re-write or recompile the code for the existing applications to enable them to be ported into an open-type execution environment. Nevertheless, due to the complexity of those applications and the difficulties in testing them, the price of such porting generally proves to be prohibitive.

Consequently, there is a need to port existing applications from a mainframe transaction world of proprietary-type to an open-type transaction environment, in particular making it possible to adapt those applications, or even to integrate those applications within new applications.

There is also a need for applications running in an open-type transaction execution environment, for which a part of those applications is formed by software components developed for an open-type transaction execution environment and another part is formed of software components developed for a proprietary-type transaction execution environment, in particular in order to enable the re-use of components already developed for proprietary-type transaction execution environments and also to enable those components and more generally those applications to be adapted.

The invention enables at least one of the problems set forth earlier to be solved.

The invention thus relates to a device for executing at least one transaction in a transaction processing system comprising a transaction monitor executable in an open-type execution environment, said at least one transaction being executed by a sequential execution of a plurality of transaction components, said device comprising the following means, means for receiving, from said transaction monitor, at least one command for executing at least one transaction component of said plurality of transaction components, said at least one transaction component being developed for a proprietary-type execution environment that is distinct from said open-type execution environment; and, means for creating a proprietary-type execution space and executing said at least one transaction component.

The device according to the invention thus enables a mainframe type transaction system to be adapted to an open-type system while keeping existing transaction applications, in particular applications written in the COBOL or C languages developed for proprietary-type execution environments.

The device according to the invention furthermore makes it possible to use a transaction engine independent from the hardware platform implemented and also to use a transaction engine independent from the application server implemented.

According to a particular embodiment the device further comprises a working memory, said means for creating a proprietary-type execution space and for executing said at least one transaction component comprising means for the reading from and/or the writing to said working memory of at least one item of data, said at least one item of data being used to execute at least one part of said at least one transaction.

The device according to the invention thus enables the transaction logic and the transaction mechanisms of the original system to be kept, for example mechanisms for chaining processing routines for transactions and for activating services.

Advantageously, said means for creating a proprietary-type execution space and for executing said at least one transaction component comprise means for managing an execution context of said at least one transaction.

Still according to a particular embodiment, the device further comprises means for executing at least one second transaction component of said plurality of transaction components that is distinct from said at least one transaction component referred to as first transaction component, said at least one second transaction component being developed for said open-type execution environment.

The device according to the invention thus enables existing transaction applications, in particular applications written in the COBOL or C languages, to be progressively adapted to applications that are executable in an open-type execution environment, for example Java applications.

Still according to a particular embodiment, said transaction monitor comprises communication means for exchanging data with an external system, said communication means being adapted to receive a command for executing at least one part of said at least one transaction. The device according to the invention thus makes it possible to receive execution commands from a client station managing at least one part of the execution of said transaction.

Advantageously, the device further comprises means for managing transaction components, said means for managing transaction components being adapted to receive a sequence of transaction component identifiers and to sequentially transmit commands for executing the transaction components corresponding to each of said received identifiers. The device according to the invention is thus capable of managing the execution of transactions making use of services.

According to a particular embodiment, the device further comprises connecting means adapted to transmit an execution command, received from a transaction component of said at least one transaction, to at least one external application. The device according to the invention is thus capable of making use of external applications for executing at least one part of a transaction.

Still according to a particular embodiment, said connection means are compatible with an architecture offering client/server type services between applications executed in different environments. The device according to the invention may thus be integrated into an open architecture implementing, for example, ESB technology (ESB standing for Enterprise Services Bus), enabling external applications to access applications using transaction components developed for a proprietary-type execution environment.

Still according to a particular embodiment, said open-type execution environment comprises an application server used as interface between an external system and said transaction monitor.

The invention also relates to a method of executing at least one transaction in a system comprising at least one transaction monitor executable in an open-type execution environment, said at least one transaction being executed by a sequential execution of a plurality of transaction components, said method comprising the following steps, receiving, from said transaction monitor, at least one command for executing at least one transaction component of said plurality of transaction components, said at least one transaction component being developed for a proprietary-type execution environment that is distinct from said open-type execution environment;

creating a proprietary-type execution space; and, executing said at least one transaction component in said created execution space.

The method according to the invention thus enables a mainframe type transaction system to be adapted to an open-type system while keeping existing transaction applications, in particular applications written in the COBOL or C languages developed for proprietary-type execution environments.

The method according to the invention furthermore makes it possible to use a transaction engine independent from the hardware platform implemented and also to use a transaction engine independent from the application server implemented.

According to a particular embodiment, the method further comprises a step of reading or writing at least one item of data from or to a working memory of said system, said at least one item of data being used to execute at least one part of said at least one transaction. The method according to the invention thus enables the transaction logic and the transaction mechanisms of the original system to be kept, for example mechanisms for chaining processing routines for transactions and for activation of services.

Still according to a particular embodiment, the method further comprises a step of executing at least one second transaction component of said plurality of transaction components that is distinct from said at least one transaction component referred to as first transaction component, said at least one second transaction component being developed for said open-type execution environment. The method according to the invention thus enables existing transaction applications, in particular applications written in the COBOL or C languages, to be progressively adapted to applications that are executable in an open-type execution environment, for example Java applications.

Advantageously, the method further comprises a step of receiving at least one command for executing said at least one transaction to enable the execution of a transaction from a remote station.

According to a particular embodiment, the method further comprises a step of transmitting at least one execution command received from a transaction component of said at least one transaction for executing an application external to said transaction monitor. The method according to the invention is thus capable of making use of external applications for executing at least one part of a transaction.

The invention also relates to a computer program comprising instructions adapted for the implementation of each of the steps of the method described earlier when said program is executed on a computer and an information storage means, removable or not, that is partially or totally readable by a computer or a microprocessor containing code instructions of a computer program for executing each of the steps of the method described earlier. The advantages procured by this computer program and these storage means are similar to those referred to above.

Other advantages, objects and features of the present invention will emerge from the following detailed description, given by way of non-limiting example, relative to the accompanying drawings in which.

Figure 8:
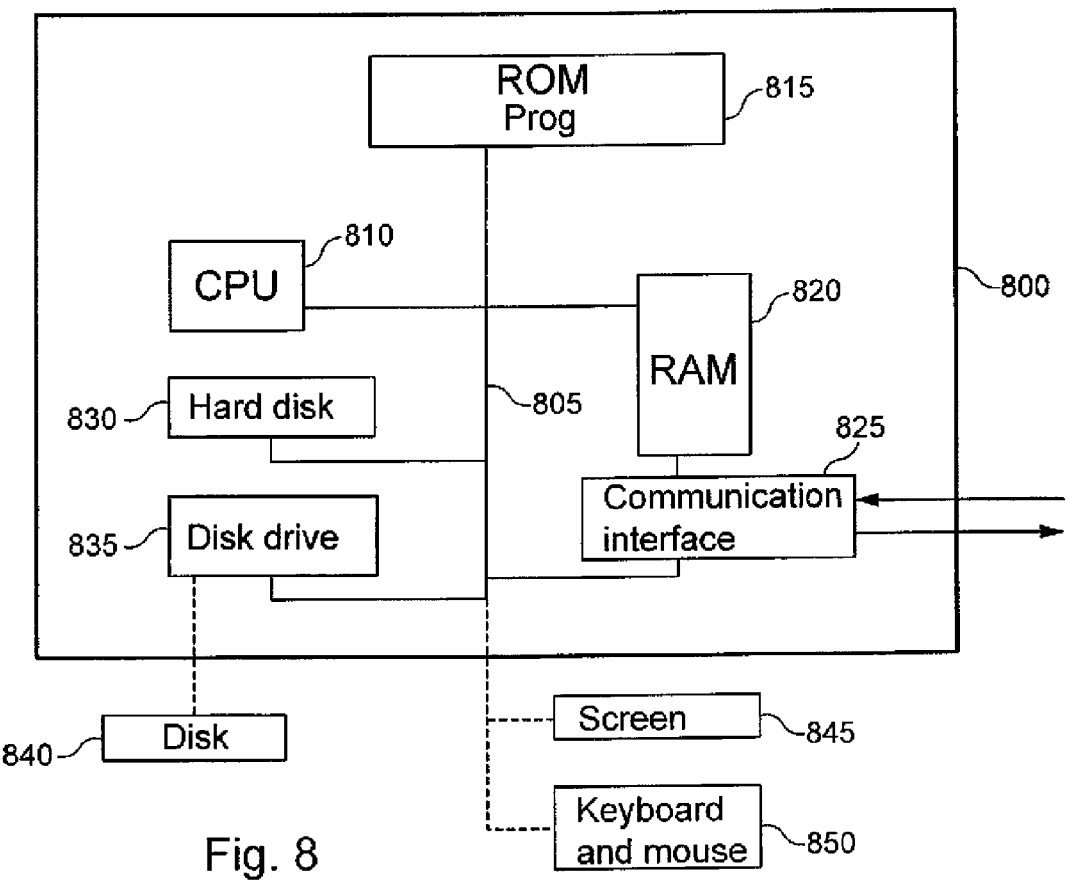
Figure 7:
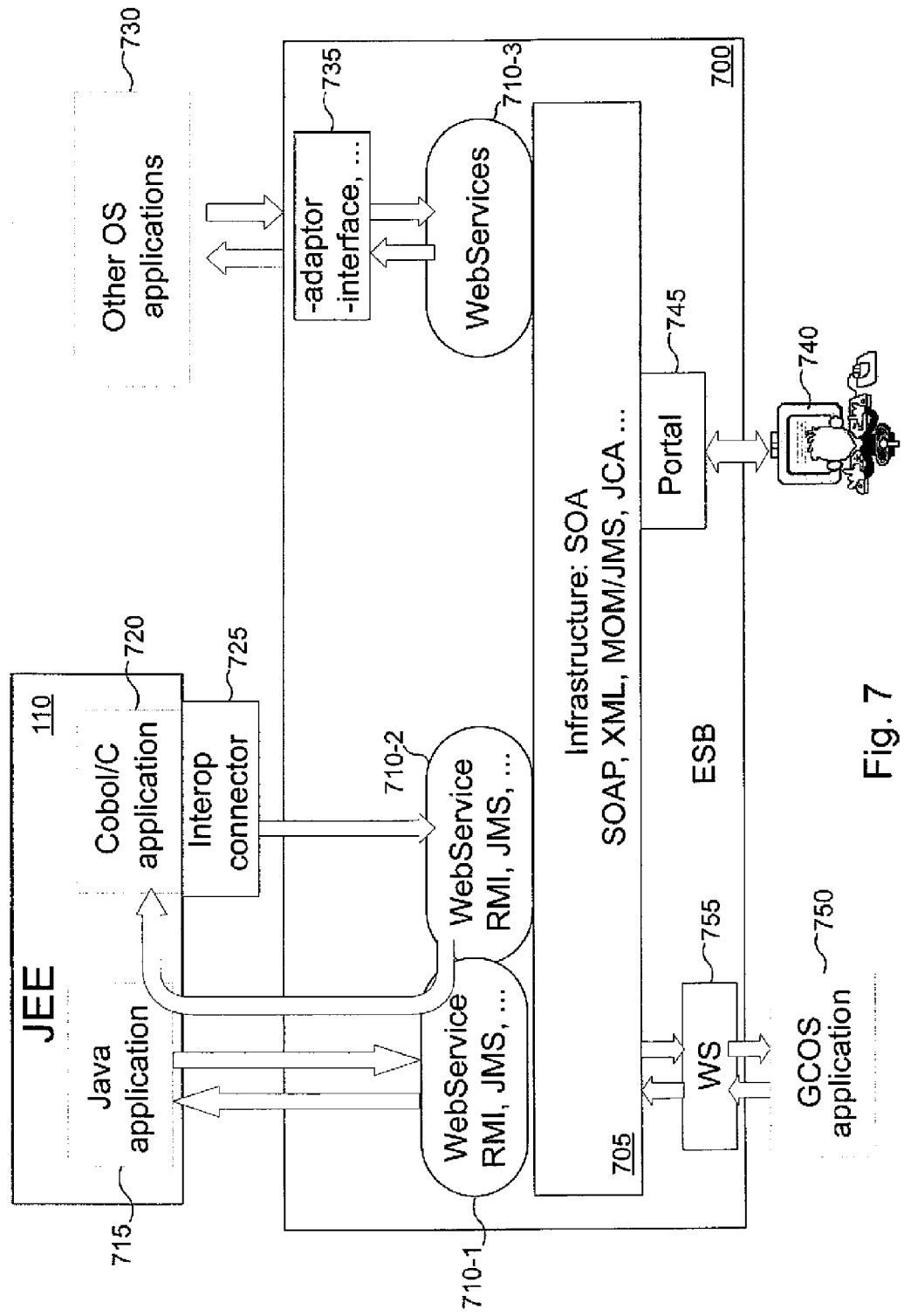

FIG. 7 is a diagram of an environment implementing the ESB technology (ESB standing for Enterprise Services Bus), enabling external applications to access applications using transaction components developed for a proprietary-type execution environment, for example C or Cobol components designed for systems of mainframe type enabling those systems to access external applications; and, FIG. 8 illustrates a device adapted to implement the invention.

The invention is generally directed to enabling the execution of transaction components developed for a proprietary-type execution environment in an open-type environment. Furthermore, the invention enables the execution of transactions of which some of the transaction components were developed for an open-type execution environment whereas other transaction components were developed for a proprietary-type execution environment.

It should first of all be recalled that a transaction may be composed of a transaction component also called TPR (standing for Transaction Processing Routine) or of a plurality of transaction components (TPRs).

The chaining of TPRs is managed by each of the TPRs, each TPR itself making use of or not making use of a following TPR.

Alternatively, the chaining of routines, in particular routines for services, is performed by a service manager in a given sequence.

In the description below, a transaction component designates a routine (TPR) or a service. A transaction component may also designate a set of routines or services.

There are moreover different implementations of transaction systems which vary, in particular, according to the distribution of tasks between the central transaction system and the client stations.

By way of illustration, the TDS transaction system (TDS standing for Transaction Driven System) and the TP8 transaction system (TP8 standing for Transaction Processing on GCOS 8), implemented on the GCOS operating systems (GCOS standing for General Comprehensive Operating System), provided by the Bull company, use a centralized architecture integrating full transaction management (TDS, TP8 and GCOS are trademarks). The client stations making use of such systems are thin clients. To be precise, to address the transaction system operating on a remote server, the client station only has available a simple client interface.

Alternatively, systems exist such as Tuxedo (Tuxedo is a trademark), commercialized by the ORACLE/BEA company, implemented on open operating systems such as Unix (Unix is a trademark), wherein part of the management of transactions is carried out in the client stations, referred to as fat clients.

The transaction monitor manages the resources and ensures synchronization, the consistency of the transactions and the integrity of the data. Its basic functions are, for example, the functions called rollback and commit.

The rollback function, in a specific context, makes it possible to cancel all the operations of a transaction that have just been carried out to restore the data manipulated by those operations to their initial state. For this, use is made of an image of the data prior to modification which is stored in a transaction log. This function is the inverse of commit.

The object of the commit function is to validate the operations carried out on the data for a transaction. After the execution of the commit, function, the information and data processed by a transaction are available for other transactions.

Figure 1:
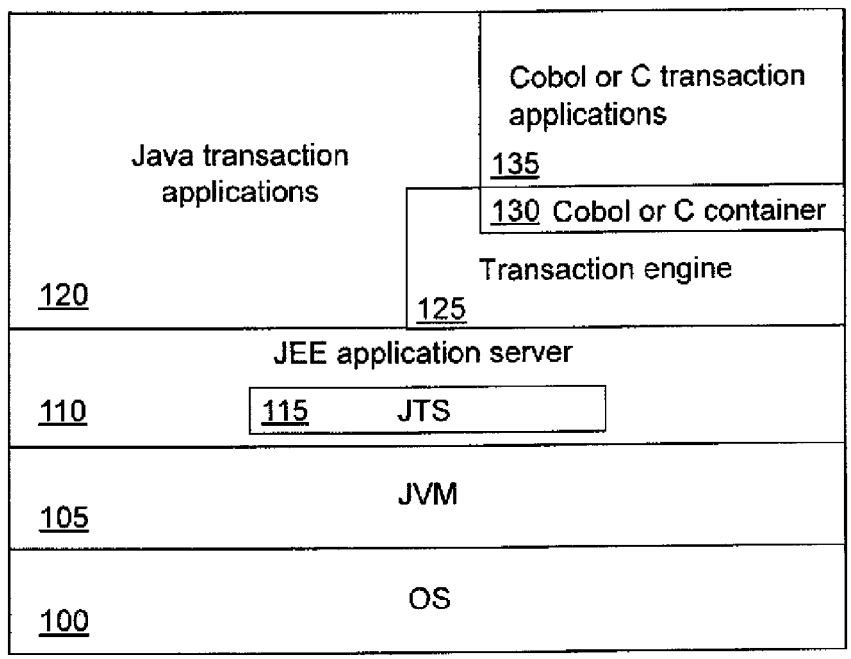
FIG. 1 is a diagram of an example of architecture in layers for an open-type software execution environment, enabling execution of a transaction which may make use of transaction components developed for an open-type execution environment and of transaction components developed for a proprietary-type execution environment.

FIG. 1 is a diagram of an example of architecture in layers in a software environment of open type, for example in a Java environment, enabling execution of a transaction which may make use of transaction components implemented in an open type execution environment and of transaction components developed for a proprietary type transaction environment.

The architecture is based here on an operating system 100 of open type, also called OS (standing for Operating System), for example Linux (Linux is a trademark).

A virtual machine is installed on that operating system to enable the interpretation of applications whose development is independent of the physical machine on which they are executed. The virtual machine used here is the Java virtual machine 105, also called JVM (standing for Java Virtual Machine), for example JVM of Sun Microsystems (JVM and Sun Microsystems are trademarks).

The JVM 105 is in particular used to enable the execution of an application server 110, for example the application server in accordance with the JEE standards JOnAS (standing for Java OpeN Application Server), JBoss (JOnAS and JBoss are trademarks), or any other JEE application server. It is to be recalled here that an application server is a software application, occupying a central layer in a multilayer architecture, having in particular the object of enabling the execution on the server of applications used by client stations. The applications are thus executed on the server whereas the man-machine interfaces are executed on the client stations.

The application server 110 comprises in particular transaction services 115, called JTS (standing for Java Transaction Services) in the JEE standard. These services 115 implement, for example, the commit and rollback functions already described.

The application server 110 is also used, here, as an interface with a transaction engine 125 itself used as interface with Java transaction applications 120 and transaction applications 135 developed for a proprietary type execution environment that have been developed to be executed on mainframe type systems.

The execution of transaction applications 135 developed in the COBOL or C languages for a proprietary type execution environment is performed via a Cobol or C container 130.

The transaction engine 125 and the Cobol or C container 130 enable execution of transaction applications developed in the COBOL or C languages for a proprietary type execution environment (135), alongside transaction applications developed in JAVA, as illustrated in the architecture represented in FIG. 1.

It also makes it possible to execute transactions making use of transaction components developed for an open type execution environment and others developed for a proprietary type execution environment.

It is to be noted that it is also possible to execute applications or transaction components developed in any other language by using the appropriate container or containers.

Figure 2:
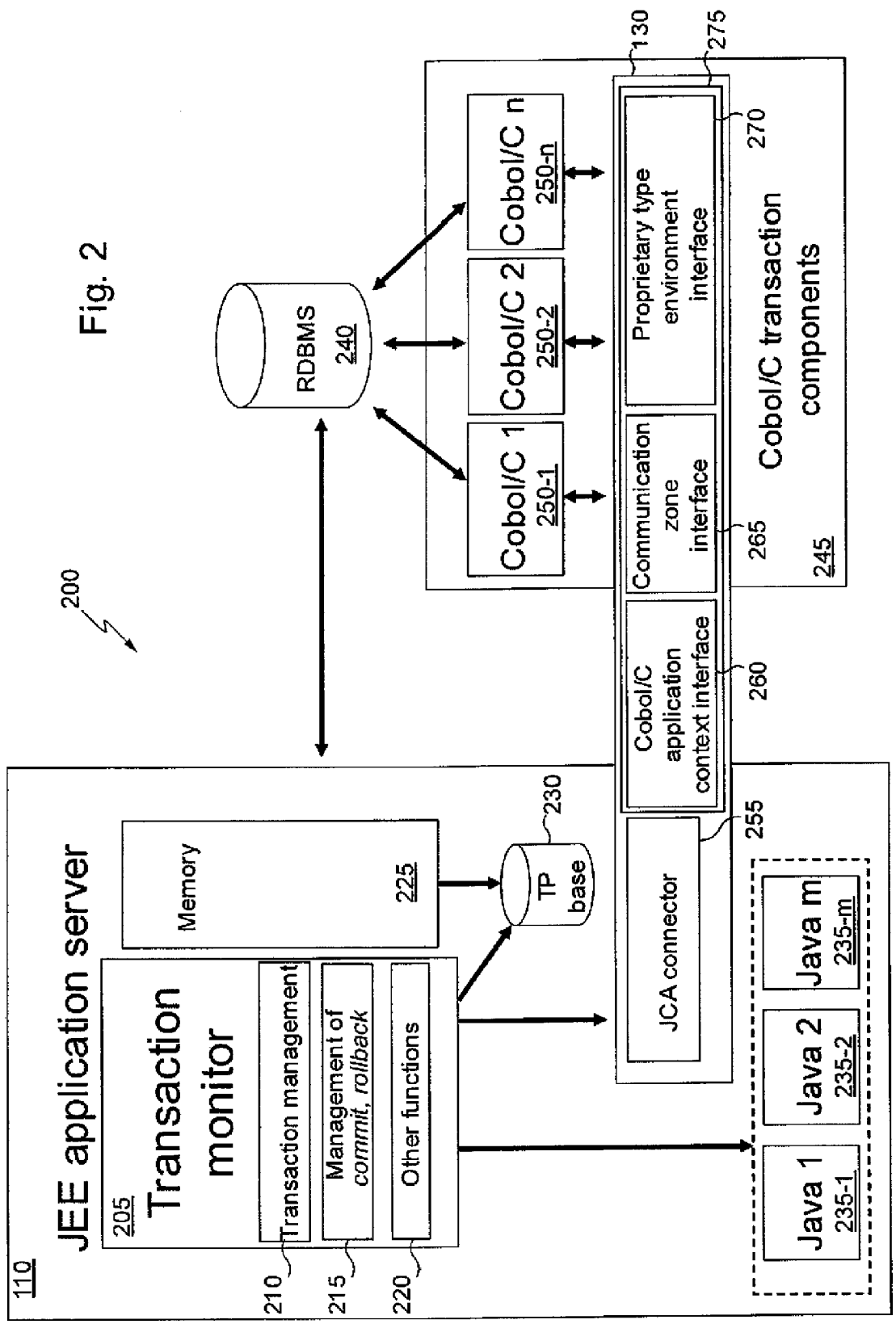
FIG. 2 illustrates more precisely the architecture implemented in an open-type application server for executing transactions implemented by transaction components developed for a proprietary-type execution environment, which are accessible via a container.

FIG. 2 illustrates more precisely the architecture 200 implemented in an open-type application server, for example JEE, for executing transactions comprising transaction components developed for a proprietary-type execution environment, which are accessible via a container.

The transactions, and more generally the functions implemented in the architecture 200, may be called from the outside by a thin client, a fat client or a service, in particular a web service, as described with reference to FIGS. 5, 6 and 7.

The application server 110 comprises a transaction monitor 205 itself comprising a module 210 for managing transactions, a module 215 for managing transaction processing functions, in particular, the functions commit and rollback, and a module 220 for managing the other functions necessary for the execution of the transactions (for example the management of the chaining of the TPR routines or services and the management of the execution contexts for the TPR routines or services).

The application server 110 also comprises a working memory 225, which is adapted, in particular, to store the execution context, and a database 230 used, in particular, for the management of the execution contexts, the restoration of transaction configurations in case of failure of a transaction and the storage of the configuration information for the transaction environment.

The application server 110 further comprises transaction components developed for the Java open type execution environment, for example the Java transaction components 235-1, 235-2 and 235-m.

The data processed by the transactions executed from the application server 110 are stored here in a database of the database management system 240 of RDBMS type (RDBMS standing for Relational DataBase Management System).

The COBOL or C transaction applications referenced 135 in FIG. 1 comprise transaction components written in the COBOL or C languages. These components are for example transaction components developed for a proprietary type execution environment, for example TPRs in the GCOS environment or services in the Tuxedo environment. These transaction components are represented by the reference 245 in FIG. 2. They comprise, in particular, the components 250-1, 250-2 and 250-n which may in particular access the database management system 240.

The transaction monitor 205 may directly access the transaction components 235-1 to 235-n developed for a Java open type execution environment. It may also access the transaction components 250-1 to 250-n developed in the COBOL language for a proprietary type execution environment via the Cobol container 130.

The transaction monitor 205 has been developed so as to provide the ACID functions for the GCOS transaction environments and in any other transaction environment.

The Cobol container 130 comprises several modules as illustrated in FIG. 2. In particular, the Cobol container 130 comprises a JCA connector (JCA standing for Java Connector Architecture) 255, a module 260 for execution context management, a module 265 for communication management, and a module 270 for interfacing with the transaction components developed in the COBOL or C languages (or in any other language) for a proprietary type execution environment.

The JCA connector 255 has in particular the object of providing the interface for execution and interaction with the COBOL or C (or other) transaction components and of providing the interface for the JEE transaction execution functions in XA mode (communication interface between a resource manager and a transaction manager) or LocalTransaction, for example the Commit and Rollback functions, adapted to be used directly by the JEE application server 110. These functions are propagated to the resources (a resource being, for example, a connection to a database) involved in the transaction. This connector also incorporates a specific interface for calling Cobol or C (or other) transaction components, this being in particular a standard interface for calling native functions, for example the JNI interface (JNI standing for Java Native Interface) from JAVA or the TCP interface (TCP standing for Transport Communication Protocol).

The execution context management module 260 is used for keeping the execution environment for the COBOL or C (or other) transaction components developed for a proprietary type execution environment according to the original transaction environment and/or the execution environment defined by the transaction monitor 205. This module is also used to update the execution environment defined by the transaction monitor 205 depending on the results of executing the transaction components developed for a proprietary type execution environment.

The communication management module 265 enables the exchange of data between the environment of the JEE application server 110 and the execution environment for the transaction components developed for a proprietary type execution environment. It makes it possible, in particular, to exchange data between the memory 225 and the COBOL or C (or other) transaction components generically referenced 250.

The module 270 for interface with the transaction components developed for a proprietary type execution environment has in particular the object of processing the functions specific to those components. The specific functions here are functions provided by the proprietary type execution environment (for example, all the APIs, standing for Application Programming Interfaces, of the proprietary type execution environment execution engine) for which were designed the transaction components developed for that environment but whose equivalent does not exist in the open type environment supplied by the application server 110.

The Cobol or C container 130 implements a multitask mechanism, also termed multithread, for simultaneously processing several transactions.

The modules 260, 265 and 270 form an execution engine 275 also called runtime enabling the COBOL or C (or other) transaction components to be executed in an operating system that cannot directly process those components. In other words, the runtime 275 forms a proprietary type execution space enabling the execution, in an open type execution environment, of transaction components developed for a proprietary type execution environment.

In particular, this runtime will make it possible, via the JCA connector 255, to execute, in an open type execution environment, in particular JAVA, those COBOL or C (or other) transaction components developed for a proprietary type execution environment.

The runtime also enables the execution of the components developed in particular in Java.

Furthermore, the transaction engine 205 makes use of the runtime 275 for the driving of heterogeneous transaction components including, for example, C and Cobol transaction components.

For this, the runtime creates an execution space, in particular to manage the information required for the execution of the components, including the restoration of context in case of problem.

The Cobol, C or other code is compiled according to the characteristics specific to the runtime used which may, for example, be that of the Micro Focus company for Cobol.

Thus, according to the present embodiment, the transaction components 250, are executed using the runtime 275 in an open type execution environment (Java according to FIG. 2).

As for the Cobol or C container 130, it is possible to use a particular container for another language, having a similar structure to the structure of the Cobol or C container 130, for executing transaction components written in that language.

Figure 3:
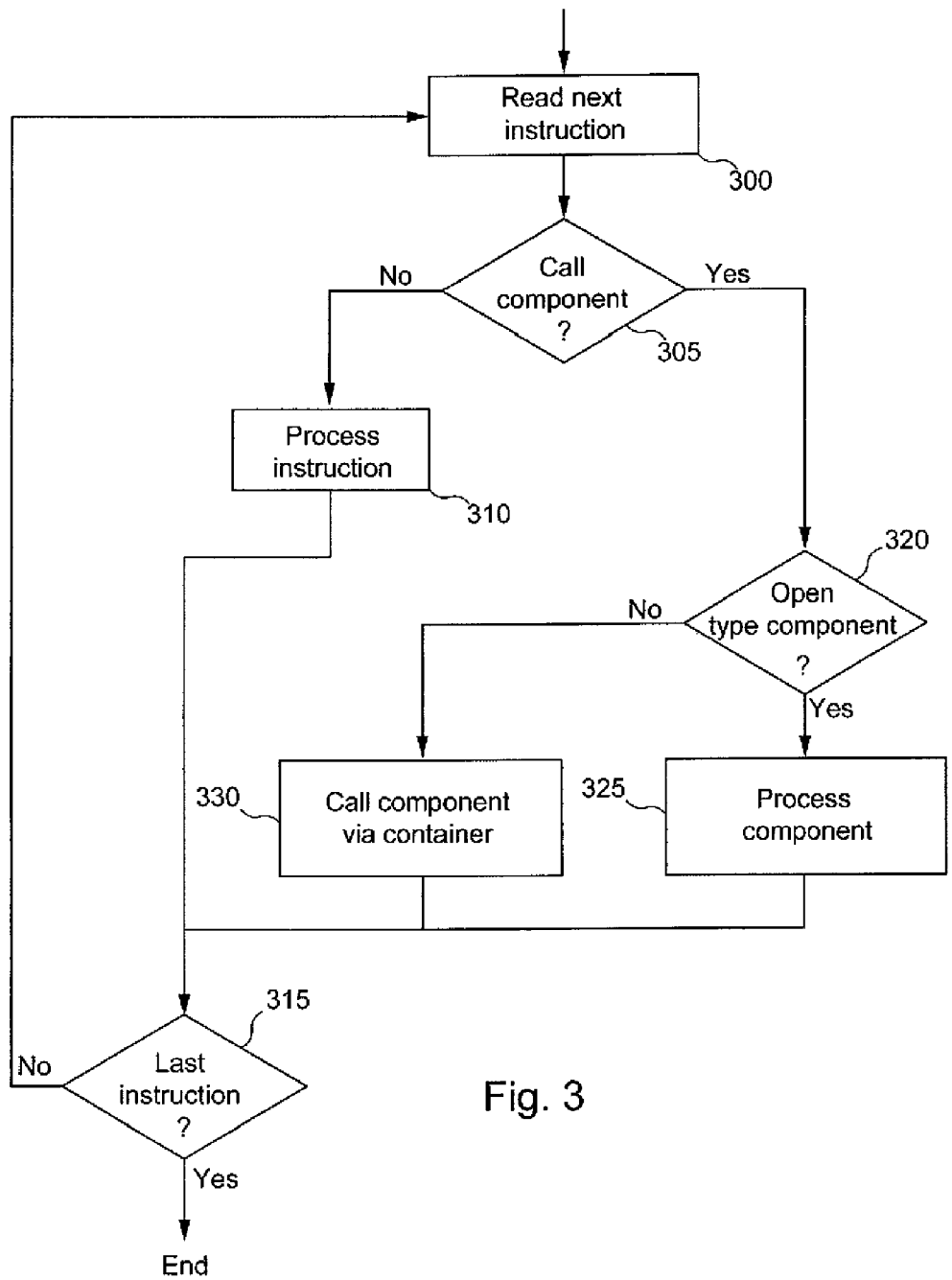
FIG. 3 is a diagram of an example algorithm for processing the transaction components of a transaction.

FIG. 3 is a diagram of an example algorithm for processing transaction components. The transaction components are processed here in turn. This algorithm is, for example, executed in the transaction management module 210 illustrated in FIG. 2.

An object of a first step (step 300) is to read the next instruction. This corresponds to the first instruction when the processing of the transaction begins or to the instruction following the instruction in course of processing when the first instruction has been processed.

A following step consists of a test for determining the nature of the instruction (step 305) and more particularly whether the instruction is a call to a transaction component such as a TPR routine or a service. If the instruction does not correspond to a transaction component, it is processed in standard manner (step 310).

A test is then carried out to determine whether the instruction processed is the last (step 315). In the affirmative, the instruction processing algorithm terminates. If the processed instruction is not the last, the following instruction is selected to be processed in its turn (step 300).

If, at step 305, the instruction corresponds to a call to a transaction component, a test is carried out to determine whether the component is a transaction component implemented in an open type execution environment or a transaction component developed for a proprietary type execution environment (step 320).

If the transaction component has been developed for an open type execution environment, it is processed in standard manner in that environment (step 325), without using the container 130.

If, on the contrary, the transaction component was developed for a proprietary type execution environment, that component is called through a container (step 330), for example the Cobol or C container 130 if that component uses the Cobol language or the C language, to be executed by the runtime 275, in the open type execution environment.

Step 315 follows steps 325 and 330 during which a test is then carried out to determine whether the instruction processed, corresponding to a component call, is the last. In the affirmative, the instruction processing algorithm terminates. If the processed instruction is not the last, the following instruction is selected to be processed in its turn.

As illustrated in FIG. 3, the transaction components are processed in turn, without direct interaction between each component. It is consequently possible, in a transaction, to make use of transaction components developed for an open type execution environment and transaction components developed for a proprietary type execution environment.

Thus, a transaction application developed for a proprietary type execution environment and calling several transaction components developed in a proprietary type execution environment may be executed in an open type execution environment. Furthermore, it is possible to port, modify, or re-write the components written in particular in Cobol language or in C language, in a Java type language, thereby facilitating the adaptation of an application developed in an environment of mainframe type into an open type execution system. Furthermore, a return backwards (from Java to Cobol or C) is still possible if the porting of one or more components gives rise to problems.

According to a particular embodiment, shared data structures are used to perform the sharing of the data and to facilitate the application porting. An example of such a structure is the structure here called TP-storage (referenced 405 in FIG. 4), which enables the exchange of data between the open type execution environment and the runtime 275 for executing the transaction components developed for a proprietary type execution environment.

This structure comprises, for example, a field called next-TPR indicating the identifier of the next TPR routine to execute, as well as commit and rollback indicators, which are used to indicate the success or failure of the execution of the TPR routine. This structure is used, for example, by the transaction components developed for a proprietary type execution environment that is to be executed in the open type execution environment.

This structure further comprises a plurality of zones for sharing data.

Functions for exchanging data are used in the runtime 275 for exchanging data between a transaction component developed for a proprietary type execution environment, for example a TPR routine written in Cobol language, and the transaction monitor memory 225. Its exchanges are made possible in particular via the MI interface included in the connector 255. Thus, functions of Get_TP_Storage type and Set_TP_Storage type may be used in the runtime 275 for accessing the data stored in the working zone of the transaction monitor (referenced 405 in FIG. 4) or for writing data therein, respectively.

By way of illustration, a mechanism making it possible to call a second TPR routine, called TPR2, from a first TPR routine, called TPR1 and which is written in Cobol, is now briefly described.

It is first of all to be recalled that although the TPR routine called TPR2 is a transaction component here developed for an open type execution environment, it could also be a transaction component developed for a proprietary type execution environment. As the first TPR routine (TPR1) has no knowledge of the type of component called, it is necessary to transfer that call to the transaction monitor. Thus, the call to a TPR routine is carried out via shared data, in particular via a Cobol function of "move TPR2 to next-TPR" type.

Figure 4:
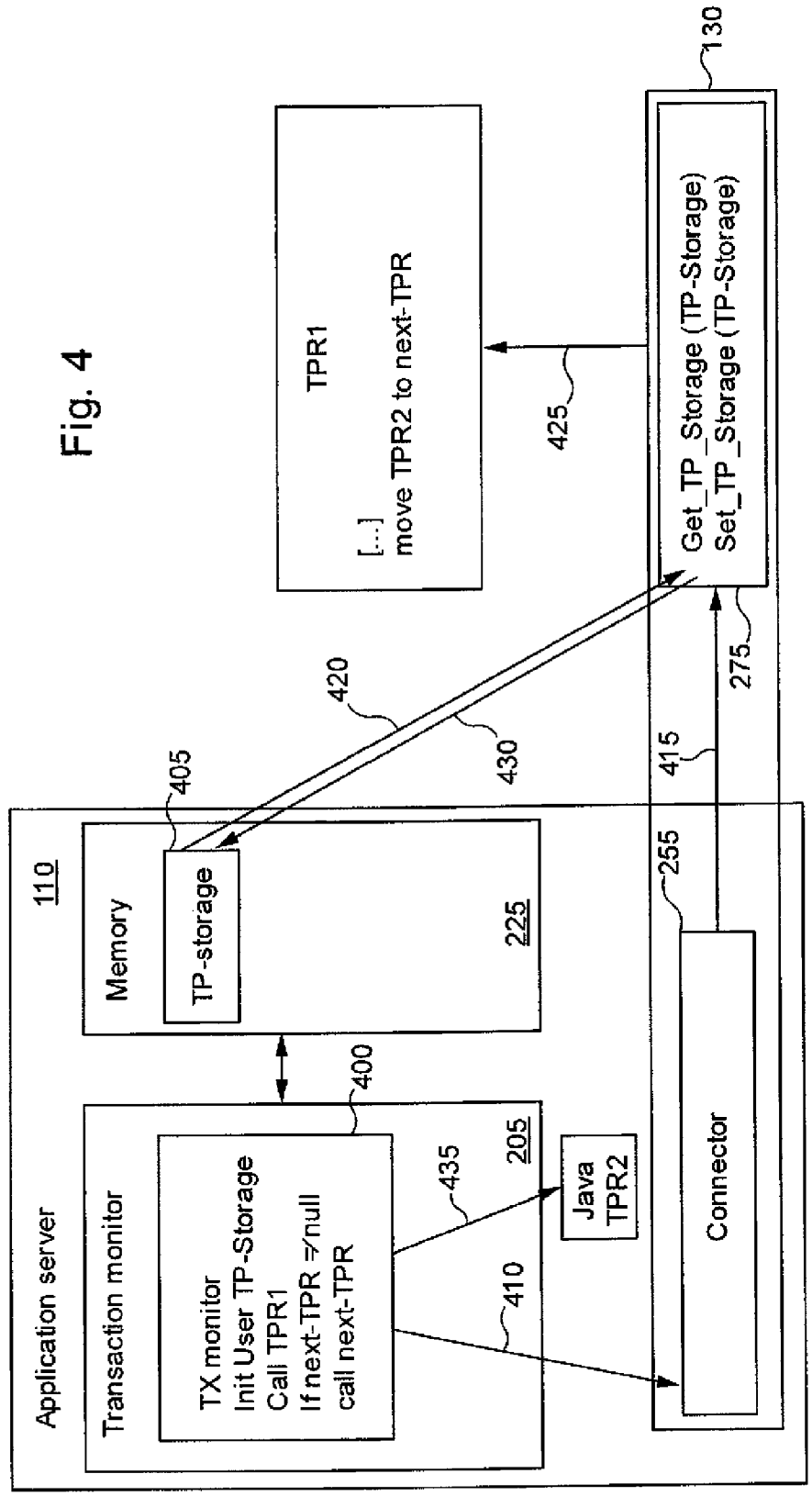
FIG. 4 illustrates an example of processing the chaining of two TPRs (standing for Transaction Processing Routines), by a transaction monitor, in which the first TPR routine has been programmed for a proprietary-type execution environment whereas the second TPR routine has been developed for an open-type execution environment.

FIG. 4 illustrates such an example of calling a second TPR routine by a first TPR routine developed in a proprietary type execution environment.

The transaction monitor 205 here manages a transaction implemented by the instructions 400 whose processing is, for example, in accordance with that described earlier with reference to FIG. 3. The management of the instructions 400 is, for example, carried out by the module 210 for managing the transactions of FIG. 2. The TPR routine TPR1 is in particular called ("call TPR1" instruction). The working memory 225, associated with the transaction monitor 205, comprises data 405 of which the structure TP-storage is predetermined.

After the initializing steps (instructions "Moniteur TX" and "Init User TP-Storage"), the transaction begins with the execution of the TPR routine TPR1 (instruction "call TPR1").

This TPR routine being, in this example, in Cobol, the transaction monitor 205 launches the execution of the TPR routine TPR1 via the Cobol container 130. For this, use is made of the connector 255 comprising the JNI connector enabling the Java platform to call a COBOL function and the runtime 275 capable of executing the code written in COBOL language (steps 410 and 415). Before launching the execution of the TPR routine TPR1, the runtime 275 will search for the data associated with the execution context of the transaction, in particular the data belonging to the data structure TP-storage 405, in the working memory 225 associated with the transaction monitor 205 with the GET_TP_Storage function (step 420). These data are data linked in particular to the system or to the user.

The TPR routine TPR1 is then executed (step 425). At the end of its execution, or during that execution, the value TPR2 is written in the field next-TPR of the structure TP-storage 405, using the Cobol function "move". After the execution of the TPR routine, the runtime 275 updates the data of the structure TP-storage in the memory 225, in particular the variable next-TPR is updated to the value TPR2 (step 430) using the SET_TP_Storage function.

After the execution of the instruction "call TPR1" of the set of instructions 400, the following instruction "if next-TPR≠null call Next-TPR" is executed. This instruction has the function of testing the value of the variable next-TPR. If this variable is different from the null value then a new TPR routine must be executed.

In the example of FIG. 4, as the variable next-TPR is equal to TPR2 due to the command "move TPR2 to next-TPR" executed by the TPR1 routine and due to the SET_TP_Storage executed by the runtime, the TPR routine TPR2 is then activated by the transaction monitor (step 435).

In the present example, the TPR routine TPR2 has been implemented in an open type execution environment, i.e. JAVA, and its execution will be controlled by the transaction engine 205.

This mechanism makes it possible to keep the transaction logic throughout the management of the chaining of the TPRs as in the mainframe type systems such as TP8, TDS or others.

In the same manner, services may be called by the transaction monitor 205.

Figure 5:
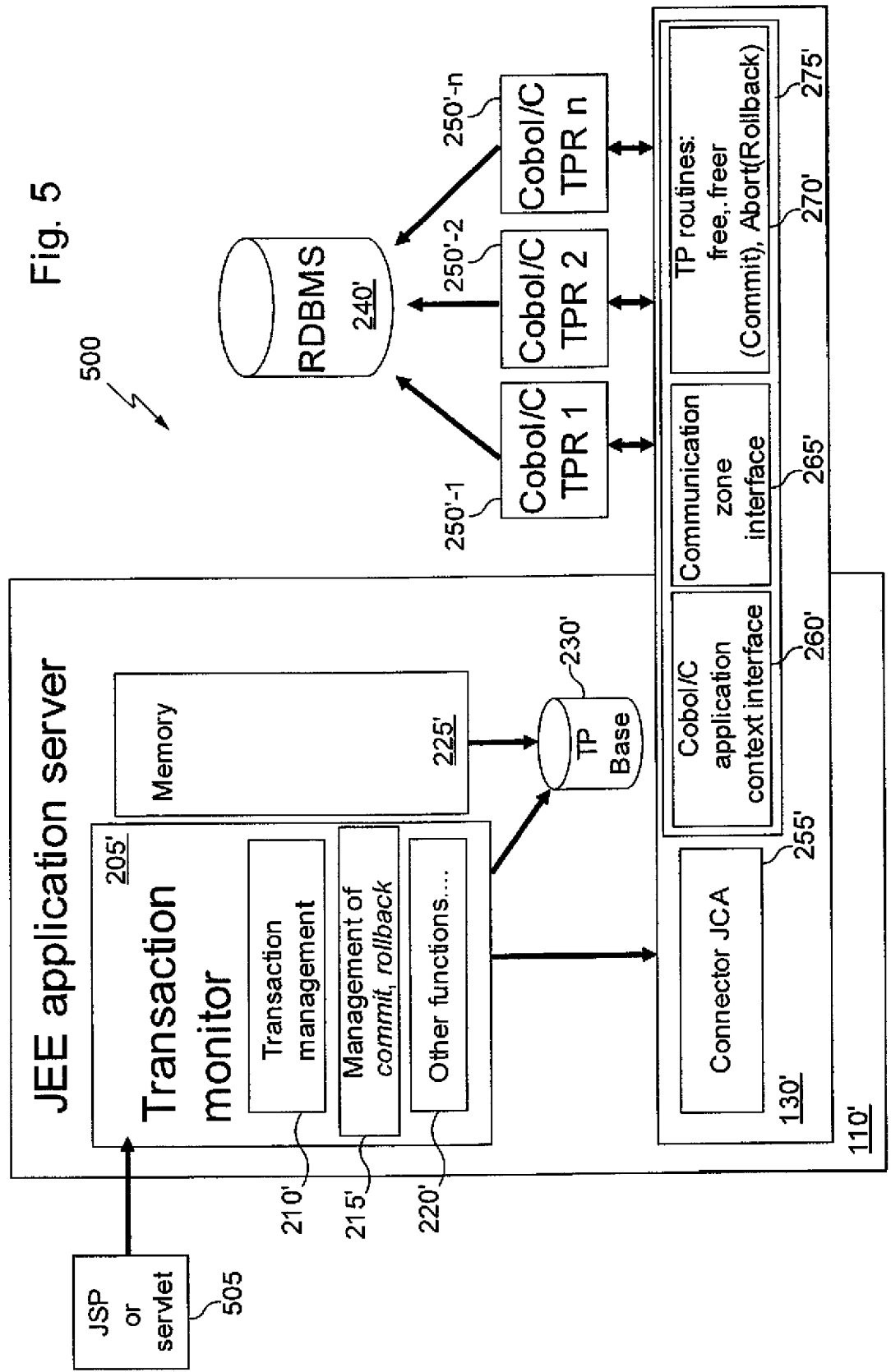
FIG. 5 illustrates an example of implementation of the invention in a transaction context wherein the transactions are entirely managed by a transaction monitor and by the TPR routines.

FIG. 5 illustrates an example of implementation of the invention in a transaction context wherein the transactions are entirely managed by the transaction monitor.

In a similar way to the architecture 200 illustrated in FIG. 2, the architecture 500 implements a JEE application server 110' comprising, in particular, a transaction monitor 205', a working memory 225' as well as a database 230'.

Similarly, the transaction monitor 205' comprises a module 210' for managing transactions, a module 215' for managing transaction processing functions, in particular, the functions commit and rollback, and a module 220' for managing the other functions necessary for the execution of transactions.

The application server 110' further comprises transaction components developed for the Java open type execution environment (not represented).

The application server 110' may be accessed by a thin client 505 implementing, for example, JSP technology (JSP standing for Java Server Pages) or servlet technology.

It is to be recalled here that JSP technology, based on Java, makes it possible to dynamically generate HTML text (HTML standing for HyperText Markup Language), XML text (XML standing for Extensible Markup Language) or any other type of web page. This technology may thus be used to provide an interface giving access to remote services, in particular transactions.

Servlet technology enables dynamic generation of the presentation of data within an http server (http standing for HyperText Transfer Protocol) and to present those data, for example, in HTML or XML format.

The transactions processed in the environment 500 take the form of chaining of TPR routines, one TPR routine calling the next as described earlier. The transaction monitor does not therefore manage the chaining of the routines, which is managed by the routines themselves. However the transaction monitor manages the transactions or sets of transactions called by the thin client 505.

As in the architecture 200, the data processed by the transactions executed from the application server 110' are stored here in a database of the database management system 240' of RDBMS type.

The information concerning the execution context of a transaction are stored in a shared memory, written in a database 230' and used in context restoration operations, in particular in case of returning to a previous state further to a transaction failure.

The database 230' also stores the configuration information of the transaction environment.

It is to be noted that this context is written in the database 230' at each validation function in a transaction component (commit function).

The transaction monitor 205' may directly access the transaction components developed for the Java open type execution environment and directly access the transaction components 250'-1 to 250'-n developed for a proprietary type execution environment via the Cobol or C container 130' comprising the modules 255', 260', 265' and 270' whose functions are similar to the modules 255, 260, 265, and 270.

The runtime 275' is adapted to process certain routines that are specific to the proprietary type execution environments to enable the transaction monitor to activate those routines by dialoging via the memory 225'. It is also adapted to directly execute certain specific functions, for example the TP_send and TP_receive functions.

Figure 6:
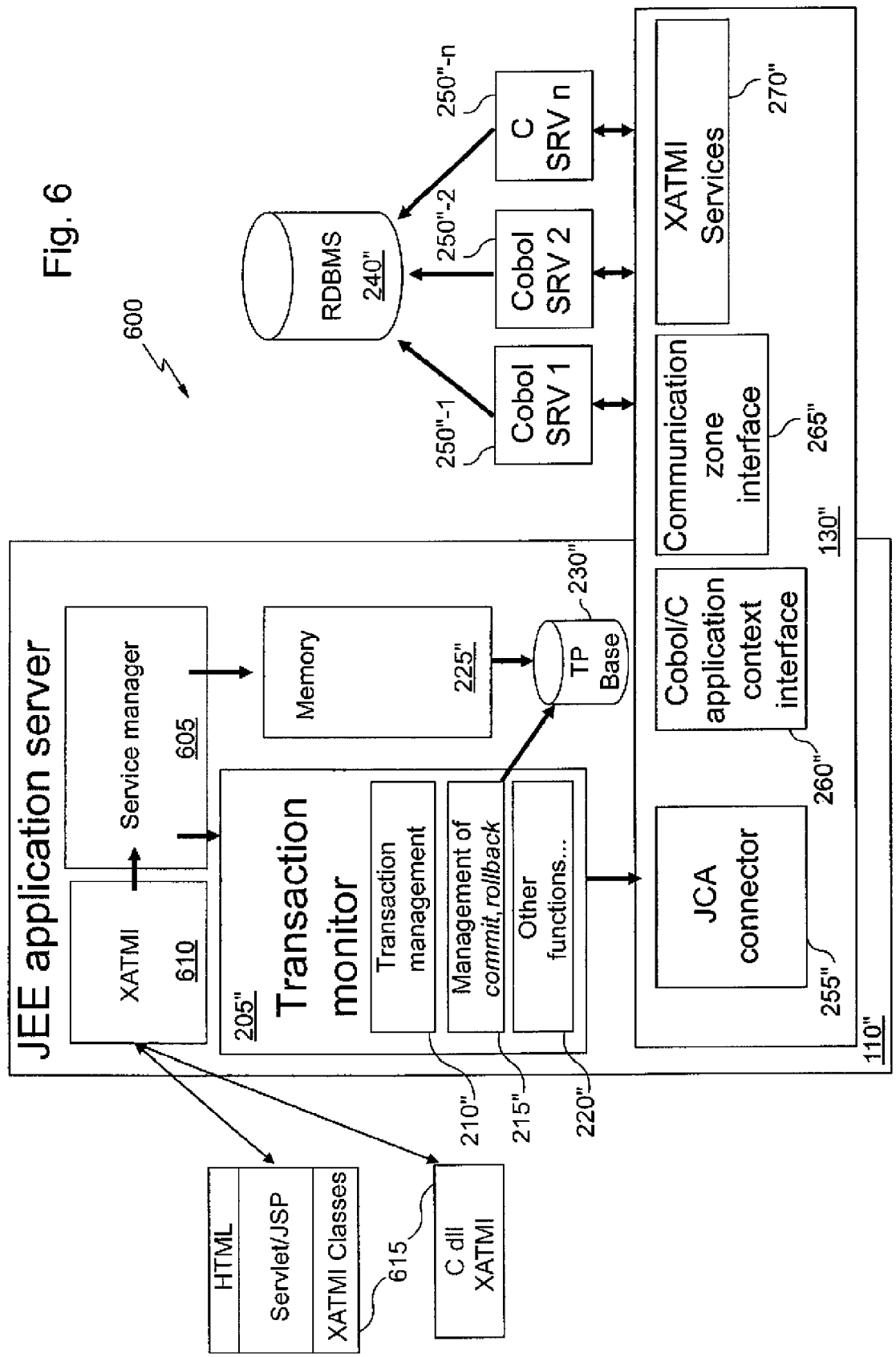
FIG. 6 illustrates an example of implementation of the invention in a transaction context wherein the transactions are partially managed by an application server and partially by a client station.

FIG. 6 illustrates an example of implementation of the invention in a transaction context wherein the transactions are partly managed by the application server and partly by a client station.

In a similar way to the architecture 200 illustrated in FIG. 2, the architecture 600 implements an application server 110" comprising, in particular, a transaction monitor 205", a working memory 225" as well as a database 230".

Similarly, the transaction monitor 205" comprises a module 210" for managing transactions, a module 215" for managing function processing functions, in particular, the functions commit and rollback, and a module 220" for managing the other functions necessary for the execution of transactions. It also comprises services developed in the Java open type execution environment (not represented).

The application server 110" further comprises a service manager 605 enabling the synchronous or asynchronous execution of the services activated by the client station and an interface 610 of XATMI type (XATMI standing for X/Open Application to Transaction Manager Interface) comprising for example the functions tpcall and tpacall enabling services to be called.

The interface 610 is accessible from a fat client 615 also implementing a remote interface of XATMI or JXATMI type (JXATMI standing for Java XATMI, implemented by the BULL company) using, for example, the JSP or servlet technology. The remote XATMI interface may be implemented, in the client station, using classes or dlls (dll standing for Dynamic Link Library).

The XATMI interface provides a request/response type access mode.

The transactions are managed form the client station in the form of the chaining of services whose calls are stored in a buffer memory of the service manager 605.

The transactions managed in the environment 600 take the form of the chaining of services, each of the services being called independently of the others by the client station via the service manager or by another service. The transaction monitor must therefore manage the call for each service used.

As in the architecture 200, the data processed by the transactions executed from the client station 615 and from the application server 110' are stored here in a database of the database management system 240' of RDBMS type.

The transaction monitor 205" may directly access the services developed for the Java open type execution environment and C or Cobol services 250"-1 to 250"-n developed for a proprietary type execution environment via the container 130" comprising the modules 255", 260", 265" and 270" whose functions are similar to the modules 255, 260, 265 and 270.

It should be noted here that the services may directly call each other via the XATMI interface. It is thus not necessary to implement the management mechanism for the chaining of the transaction components described earlier, in particular with reference to FIG. 4.

The information concerning the configuration of the transaction environment are stored in a shared memory and are written in a database 230".

The mechanism implemented in the architecture 600, described with reference to FIG. 6, enables the transaction logic to be kept throughout the management of the services as in systems such as Tuxedo and ENCINA (ENCINA is a trademark).

Although FIGS. 5 and 6 are directed to two different implementations related to different transaction managements, those implementations may be integrated into the same system to enable the processing of different types of transactions.

An architecture similar to the architectures 200, 500, and 600 of FIGS. 2, 5 and 6 may also be used to give access to proprietary type applications in an environment implementing the ESB technology (ESB standing for Enterprise Service Bus). It is to be recalled here that ESB is a computer solution for sharing applications not designed to operate together to communicate with each other.

FIG. 7 is a diagram of an environment integrating the ESB technology, enabling external applications to access, communicate, and interoperate with applications developed for a proprietary type execution environment, for example C or Cobol applications designed for systems whether or not they be of mainframe type, and enabling those applications to access external applications.

The ESB service bus 700 here comprises an infrastructure 705 of SOA type (SOA standing for Service Oriented Architecture) which enables access to be given to applications using a client/server mode.

The SOA infrastructure 705 uses, for example, the protocols SOAP (SOAP standing for Simple Object Access Protocol), XML, MOM/JMS (standing for Message-Oriented Middleware/Java Message Service) and JCA (standing for JEE Connector Architecture) to perform exchanges between applications or between applications and client stations.

The SOA infrastructure 705 implements services, in particular web services 710-1 to 710-3, also referred to as WebServices, used as interfaces with applications enabling the interoperability of those applications The web services 710-1 and 710-2, used as interfaces with the JEE application server 110, implement, for example, the API (standing for Application Programming Interface) RMI (standing for Remote Method Invocation) and JMS. The web service 710-1 thus makes it possible to directly access Java applications 715 of the application server 110.

The web service 710-2 makes it possible to access applications 720 developed for a proprietary type execution environment of the application server 110 and enables those applications to access the SOA infrastructure 705 via an interoperability managing connector 725.

The applications 720 are for example Cobol transaction applications accessible via a Cobol container implemented in the application server 110 as described earlier.

The interoperability managing connector 725 is for example a WebService interface giving external access to Cobol or C transaction components.

The web service 710-3 makes it possible to access applications 730 based on another operating system via an adaptor 735 specific to the targeted operating system.

The SOA infrastructure 705 is accessible to a user 740 via the portal 745. It may also be used as a point of entry to a transaction application 750 such as GCOS via a specific web service 755.

Generally, the SOA infrastructure 705 enables applications executed in different environments to call each other.

For example, a TPR routine or a service of a Java application 715 executed by the application server 110 may access an external application, executed on another operating system, such as the application 730, via the web service 710-1, the SOA architecture 705, the web service 710-3, and the adaptor 735. Similarly, the external application 730 may access a Java application 715. Such access is similar to an access made by a user via a client station.

Similarly, a TPR routine or a service of a Cobol application 720 executed by the application server 110, for example the TPR routine 250'-2 of FIG. 5 or the service 250"-2 of FIG. 6, may access an external application such as the application 730 via the interoperability managing connector 725, the web service 710-2, the SOA architecture 705, the web service 710-3, and the adaptor 735. Similarly, the external application 730 may access a Cobol application 720. Nevertheless, in this last case, it is not necessary to use the interoperability managing connector 725, as the access to the application developed for a proprietary type execution environment is made via a container, as described earlier.

A device adapted to implement the invention is illustrated in FIG. 8. The device 800 is for example a computer or a server.

The device 800 here comprises a communication bus 805 to which there are connected:

a central processing unit (CPU) or microprocessor 810;

A read only memory 815 (ROM) which is able to comprise programs "Prog" for data processing and/or transaction management.

a random access memory (RAM) or cache memory 820, comprising registers adapted to record variables and parameters created and modified during the execution of the aforementioned programs; and, a communication interface 825 adapted in particular to exchange data with a communication network.

The device 800 may also have:

a screen 845 making it possible to view data and/or serving as a graphical interface with the user who will be able to interact with the programs in accordance with the invention, using a keyboard and a mouse 850 or another input and pointing device;

a hard disk 830 which may comprise the program "prog" and the aforesaid software modules for data transmission and data processed or to be processed; and, a disc reader 835 adapted to receive a disc 840, for example a CD-ROM (standing for Compact Disc Read Only Memory) or a DVD (standing for Digital Video Disc). A disc may in particular comprise programs which may be executed directly from the disc or after installation on the hard disk 830.

The communication bus allows communication and interoperability between the different elements included in the device 800 or connected to it. The representation of the bus is non-limiting and, in particular, the processing unit 810 unit may communicate instructions to any element of the device 800 directly or by means of another element thereof.

The executable code of the programs enabling the device 800 to implement the methods according to the invention may be stored, for example, on the hard disk 830 or in read only memory 815.

According to another variant, the executable code of the programs may be received, at least partially, via the communication interface, in order to be stored in identical manner to that described previously.

The central processing unit 810 controls and directs the execution of the instructions of portions of software code of the program or programs.

Naturally, to satisfy specific needs, a person skilled in the art will be able to make amendments to the preceding description.

The invention claimed is:

1. A device for executing at least one transaction in a transaction processing system comprising a single transaction monitor executable in an open-type execution environment, said at least one transaction being executed by a sequential execution of a plurality of transaction components, said device comprising the following means:
   means for receiving, from said transaction monitor, at least one command for executing at least one transaction component of said plurality of transaction components, said at least one transaction component being developed for a proprietary-type execution environment that is distinct from said open-type execution environment; and,
   means for creating the proprietary-type execution environment in the open-type execution environment, and executing said at least one transaction component, the proprietary-type execution environment comprising at least:
   a first module configured for keeping the proprietary-type execution environment and the open-type execution environment, and updating the open-type execution environment based on results of executing the at least one transaction component;
   a second module configured for exchanging data between the proprietary-type execution environment and the open-type execution environment;
   and a third module configured for processing one or more functions associated with the at least one transaction component in the proprietary-type execution environment.

2. The device according to claim 1, further comprising a working memory, said means for creating a proprietary-type execution environment and for executing said at least one transaction component comprising means for reading from and/or writing to said working memory of at least one item of data, said at least one item of data being used to execute at least one part of said at least one transaction.

3. The device according to claim 1, wherein said means for creating a proprietary-type execution environment and for executing said at least one transaction component comprise means for managing an execution context of said at least one transaction.

4. The device according to claim 1, further comprising means for executing at least one second transaction component of said plurality of transaction components that is distinct from said at least one transaction component referred to as first transaction component, said at least one second transaction component being developed for said open-type execution environment.

5. The device according to claim 1, wherein said transaction monitor comprises communication means for exchanging data with an external system, said communication means being adapted to receive a command for executing at least one part of said at least one transaction.

6. The device according to claim 5, further comprising means for managing transaction components, said means for managing transaction components being adapted to receive a sequence of transaction component identifiers and to sequentially transmit commands for executing the transaction components corresponding to each of said received identifiers.

7. The device according to claim 1, further comprising connecting means adapted to transmit an execution command, received from a transaction component of said at least one transaction, to at least one external application.

8. The device according to claim 7, wherein said connection means are compatible with an architecture offering client/server type services between applications executed in different environments.

9. The device according to claim 1, wherein said open-type execution environment comprises an application server used as interface between an external system and said transaction monitor.

10. The device according to claim 1, wherein said means for creating a proprietary-type execution environment and for executing said at least one transaction component comprise means for identifying data structure associated with an execution context of said at least one transaction that resides on a memory associated with the transaction monitor; and updating the data structure once the at least one transaction is executed.

11. A method of executing at least one transaction in a system comprising a single transaction monitor executable in an open-type execution environment, said at least one transaction being executed by a sequential execution of a plurality of transaction components, said method comprising:
   receiving, from said transaction monitor, at least one command for executing at least one transaction component of said plurality of transaction components, said at least one transaction component being developed for a proprietary-type execution environment that is distinct from said open-type execution environment;
   and creating the proprietary-type execution environment in the open-type execution environment, and executing said at least one transaction component, which comprises at least:
   keeping the proprietary-type execution environment and the open-type execution environment;
   exchanging data between the proprietary-type execution environment and the open-type execution environment;
   processing one or more functions associated with the at least one transaction component in the proprietary-type execution environment;

and updating the open-type execution environment based on results of executing the at least one transaction component.

12. The method according to claim 11, further comprising a step of reading or writing at least one item of data from or to a working memory of said system, said at least one item of data being used to execute at least one part of said at least one transaction.

13. The method according to claim 11, further comprising a step of executing at least one second transaction component of said plurality of transaction components that is distinct from said at least one transaction component referred to as first transaction component, said at least one second transaction component being developed for said open-type execution environment.

14. The method according to claim 11, further comprising a step of receiving at least one command for executing said at least one transaction.

15. The method according to claim 11, further comprising a step of transmitting at least one execution command received from a transaction component of said at least one transaction for executing an application external to said transaction monitor.

16. A non-transitory computer readable storage medium comprising instructions for carrying out each of the steps of the method according to claim 11.

17. Memory hardware, removable or not, partially or totally readable by a computer or a microprocessor containing code instructions of a computer program for carrying out each of the steps of the method according to claim 11.

18. A device for executing at least one transaction in a transaction processing system comprising a single transaction monitor executable in an open-type execution environment, said at least one transaction being executed by a sequential execution of a plurality of transaction components, said device comprising:

a computer configured to execute software:

to receive, from said transaction monitor, at least one command to execute at least one transaction component of said plurality of transaction components, said at least one transaction component being developed for a proprietary-type execution environment that is distinct from said open-type execution environment; and, to create the proprietary-type execution environment in the open-type execution environment, and execute said at least one transaction component, the proprietary-type execution environment comprising at least:

a first module configured for keeping the proprietary-type execution environment and the open-type execution environment, and updating the open-type execution environment based on results of executing the at least one transaction component;

a second module configured for exchanging data between the proprietary-type execution environment and the open-type execution environment;

and a third module configured for processing one or more functions associated with the at least one transaction component in the proprietary-type execution environment.

* * * * *